United States Patent
Kibsgaard et al.

(10) Patent No.: US 11,168,545 B2
(45) Date of Patent: Nov. 9, 2021

(54) SYSTEM AND METHOD FOR PROVIDING INFORMATION ON PRODUCTION VALUE AND/OR EMISSIONS OF A HYDROCARBON PRODUCTION SYSTEM

(71) Applicant: EQUINOR ENERGY AS, Stavanger (NO)

(72) Inventors: Svend Tarald Kibsgaard, Stavanger (NO); Lars Brenne, Stavanger (NO); Astrid Heiland Tingstveit, Stavanger (NO)

(73) Assignee: EQUINOR ENERGY AS, Stavanger (NO)

( * ) Notice: Subject to any disclaimer, the term of this patent is extended or adjusted under 35 U.S.C. 154(b) by 47 days.

(21) Appl. No.: 16/347,962

(22) PCT Filed: Nov. 7, 2017

(86) PCT No.: PCT/NO2017/050287
§ 371 (c)(1),
(2) Date: May 7, 2019

(87) PCT Pub. No.: WO2018/088909
PCT Pub. Date: May 17, 2018

(65) Prior Publication Data
US 2019/0277115 A1    Sep. 12, 2019

(30) Foreign Application Priority Data
Nov. 9, 2016  (GB) ...................................... 1618929

(51) Int. Cl.
E21B 47/00    (2012.01)
E21B 41/00    (2006.01)
(Continued)

(52) U.S. Cl.
CPC .......... *E21B 41/0092* (2013.01); *E21B 43/00* (2013.01); *E21B 47/00* (2013.01);
(Continued)

(58) Field of Classification Search
CPC ................................. E21B 47/00; E21B 49/00
See application file for complete search history.

(56) References Cited

U.S. PATENT DOCUMENTS

2003/0014183 A1\* 1/2003 Feluch .................... E21B 43/00
701/532
2005/0284625 A1\* 12/2005 Rodney ................... E21B 43/08
166/250.01
(Continued)

FOREIGN PATENT DOCUMENTS

EA        018594       9/2013
RU      2 435 030     11/2011
(Continued)

OTHER PUBLICATIONS

International Search Report dated Jan. 15, 2018 in International (PCT) Application No. PCT/NO2017/050287.
(Continued)

*Primary Examiner* — Robert E Fuller
*Assistant Examiner* — Lamia Quaim
(74) *Attorney, Agent, or Firm* — Wenderoth, Lind & Ponack, L.L.P.

(57) ABSTRACT

A system for providing information on production value and/or emissions of a hydrocarbon production system is disclosed. The system includes: a plurality of sensors configured to measure a respective plurality of measured parameters of the hydrocarbon production system; an input interface for inputting a plurality of specified parameters into the system; and a processor configured to determine the production value and/or the emissions of the hydrocarbon
(Continued)

production system in real time based upon the measured parameters and the specified parameters.

26 Claims, 1 Drawing Sheet

(51) Int. Cl.
*G01V 99/00* (2009.01)
*G06Q 10/06* (2012.01)
*G06Q 50/02* (2012.01)
*E21B 43/00* (2006.01)
*E21B 47/06* (2012.01)
*E21B 47/10* (2012.01)
*E21B 49/00* (2006.01)
*E21B 49/08* (2006.01)
*E21B 47/07* (2012.01)

(52) U.S. Cl.
CPC ..... *G01V 99/005* (2013.01); *G06Q 10/06395* (2013.01); *G06Q 50/02* (2013.01); *E21B 47/06* (2013.01); *E21B 47/07* (2020.05); *E21B 47/10* (2013.01); *E21B 49/00* (2013.01); *E21B 49/08* (2013.01); *E21B 49/0875* (2020.05)

(56) References Cited

U.S. PATENT DOCUMENTS

| | | |
|---|---|---|
| 2006/0155474 A1 | 7/2006 | Venkataramanan et al. |
| 2008/0099241 A1 | 5/2008 | Ibrahim et al. |
| 2009/0254325 A1 | 10/2009 | Gokdemir et al. |
| 2013/0166216 A1 | 6/2013 | Foot et al. |
| 2015/0354336 A1 | 12/2015 | Maurice et al. |
| 2016/0115395 A1 | 4/2016 | Rustad et al. |
| 2016/0138389 A1* | 5/2016 | Stokely ................. E21B 47/107 340/854.7 |
| 2016/0153266 A1 | 6/2016 | Rashid et al. |
| 2016/0161536 A1* | 6/2016 | Amminudin ......... G01R 21/133 702/58 |
| 2016/0186545 A1* | 6/2016 | Holtz ...................... E21B 43/20 166/252.1 |
| 2016/0215608 A1* | 7/2016 | Jaffrey ................... E21B 33/064 |
| 2018/0023374 A1* | 1/2018 | Su .......................... E21B 49/005 703/10 |
| 2019/0120022 A1* | 4/2019 | On .......................... E21B 43/00 |

FOREIGN PATENT DOCUMENTS

| | | |
|---|---|---|
| RU | 151427 | 4/2015 |
| RU | 2 571 542 | 12/2015 |
| RU | 2 589 520 | 7/2016 |
| WO | 2012/039626 | 3/2012 |
| WO | 2012/134497 | 10/2012 |
| WO | 2014/023111 | 2/2014 |
| WO | 2015/175216 | 11/2015 |
| WO | 2016/004137 | 1/2016 |

OTHER PUBLICATIONS

Written Opinion of the International Searching Authority dated Jan. 15, 2018 in International (PCT) Application No. PCT/NO2017/050287.
Search Report dated Mar. 14, 2017 in corresponding Great Britain Application No. 1618929.2.
M. R. Brulé, "Big Data in E&P: Real-Time Adaptive Analytics and Data-Flow Architecture", IBM Software Group, SPE 163721, Mar. 5, 2013, whole document.
Z. Ma et al., "Practical Implementation of Knowledge-Based Approaches for SAGD Production Analysis", University of Alberta et al., SPE-170144-MS, Jun. 10, 2014, whole document.
Office Action and Search Report dated Mar. 18, 2021 in Russian Patent Application No. 2019117768/03(033967), with English Translation.
Zincheko, I.A., et al. "The concept of an intelligent management system for field development", Lead Gas Science, 2016, No. 2 (26), pp. 4-9, with partial English translation.
Komagorov, V.P., et al. "Adaptive management system for the development of the 'Intellectual' field", Reports of TUSUR, 2014, No. 4 (34), pp. 171-175, with English Abstract (i.e., pp. 175).
Translation of Office Action dated Aug. 11, 2021 in Russian Patent Application No. 2019117768/03(033967).

\* cited by examiner

SYSTEM AND METHOD FOR PROVIDING INFORMATION ON PRODUCTION VALUE AND/OR EMISSIONS OF A HYDROCARBON PRODUCTION SYSTEM

BACKGROUND OF THE INVENTION

1. Field of the Invention

The present invention relates to systems and methods for providing information on a production value and/or an emission value, and possibly detailed equipment performance in a hydrocarbon production system.

2. Description of the Related Art

Currently, hydrocarbon production systems are monitored in various ways. For instance, total power consumption of the hydrocarbon production system has been measured, and the composition of the fluid has been determined at the topside process facility by taking samples at time intervals.

However, in the prior art the current state of the hydrocarbon production system is measured in various software programs that are not connected or used to determine real time production values and detailed emission data for optimizing the individual components and hydrocarbon process system production.

SUMMARY OF THE INVENTION

The inventors of the present invention identified that it would be desirable for a controller of the hydrocarbon production system to be provided with more information, and with a different type of information, in order to improve the control of the hydrocarbon production system.

In a first aspect the invention provides, a system for providing information on a production value and/or an emission value of a hydrocarbon production system, the system comprising: a plurality of sensors configured to measure a respective plurality of measured parameters of the hydrocarbon production system; an input interface for inputting a plurality of specified parameters into the system; a processor configured to determine the production value and/or emissions of the hydrocarbon production system in real time based upon the measured parameters and the specified parameters. This system may also provide detailed information on the performance of the individual sub-process systems of the hydrocarbon production system, including possible equipment degradation and optionally further including a forecast of future performance or other information about future status of the hydrocarbon production system.

The present invention allows a controller of a hydrocarbon production system to be provided with real time information on the current production value and/or emissions of the hydrocarbon production system as well as with optional forecasts of future information. This can allow the controller to change parameters for optimizing the hydrocarbon production system in an informed and educated manner, with particular focus on maximizing production value and/or minimizing emissions of the hydrocarbon production system. In essence, the measured parameters are used so that the hydrocarbon production system can be controlled in an educated/intelligent manner by a controller, so as to optimize production value and emissions.

In the prior art, whilst hydrocarbon production systems are monitored in several sub programs based on sensors and algorithms, no real time information of overall production value and/or emissions of the hydrocarbon production is determined. With such prior art systems, a controller of the hydrocarbon production system is therefore unable to control the hydrocarbon production system in an informed, educated manner with a view of maximizing production value and/or minimizing the emissions of the hydrocarbon production system, as is the case with the present invention.

Further, since the present system may provide information on the performance/efficiency of the sub-process systems, it may determine (from the measured and specified parameters) information on the (or each) sub-process system's contribution to overall emissions and/or each sub-process systems contribution to production value (or loss in production value). This information can also be used by the controller to control the hydrocarbon production system in an intelligent and educated manner. In the prior art, however, the possible increase in emissions or reduced income cannot be determined from the performance of sub-process systems.

Further, in the prior art, such information is not provided in real time. Providing the information in real time also enables the hydrocarbon production system to be controlled in an informed, educated manner, particularly with a view of maximizing production value and/or minimizing the emissions of the hydrocarbon production system.

The determined production value and/or emissions are technical features as they relate to the real time state of the hydrocarbon production system, and said determined production value and/or emissions can be used by a controller receiving said information to control the hydrocarbon production system in an informed, educated manner and hence can be used to improve the control and operation of the hydrocarbon production system.

A hydrocarbon production system may be onshore or offshore. It is typically a large system housed in or on the Earth's surface, and possibly extending to a topside platform when the system is offshore. As intended herein, a hydrocarbon production system includes one or more wells extending into the hydrocarbon reservoirs and all the necessary sub-process systems (such as valves, pipelines, compressors, scrubbers, pumps, heat exchangers, energy cables, valves, motors, separators, machines, variable speed drives, gas turbines, generators, transformers and/or anti-hydrate forming sources) required to produce the hydrocarbon production fluid from the reservoir to an output (where the production fluid is output from hydrocarbon production fluid typically in a state suitable for long-distance transportation (e.g. via a pipeline or vessel) or for further processing (e.g. refining)). A hydrocarbon production system as intended herein is typically located in the vicinity of the well(s)/reservoir(s).

The input interface may be any suitable interface where said specified parameters can be input into the system. For instance, it may be a hardware interface, such as a bus, a keyboard or a touch screen. However, it may also be a software interface.

The processor may be a single physical processor. However, it may also be a plurality of physical processors that together perform the processor's function.

The processor may be configured to determine calculated or determined or predicted parameters. Any value determined by the processor discussed herein may be thought of as a calculated or determined or predicted parameter, such as the emissions and/or production value of the system of a whole and/or the individual contributions to the emissions and/or production value by the individual sub-process systems.

As is discussed in more detail below, the above system allows the measured and specified parameters to be used to quantify the production value and/or the emissions of the hydrocarbon production system. Said information can be used by a controller in decision making processes on how to operate the hydrocarbon production system.

The production value may be the total production value of the entire hydrocarbon production system (i.e. the overall production value), and/or it may comprise production values of production fluid flowing at different locations throughout the hydrocarbon production system. The production value may be found by relating flow rate and composition data to fixed reference hydrocarbon prices or real time hydrocarbon prices (from the market place). The production value may be a value in a currency, or a currency per time unit (TU), such as Norwegian Kroner/TU, British Pounds Sterling/TU, US Dollars/TU, etc., where time unit (TU) may be seconds, hour, day or year.

The emissions may be the total emissions of the hydrocarbon production system (i.e. the overall emissions), and/or they may comprise emission values at different locations throughout the hydrocarbon production system (e.g. the energy consumed and/or lost by different components of the hydrocarbon production system, e.g. the contribution to the emissions from each of the different components of the hydrocarbon production system). The emissions may be equivalent to energy consumption and/or energy loss. The emissions may be represented in terms of an energy consumption rate, or as a $NO_x$ or $CO_2$ production rate per time unit, and local taxes for such emission rates could also be quantified.

The power consumed by the individual sub-process systems may be generated by a gas turbine, which may be part of the hydrocarbon production system and may use gas produced by the hydrocarbon production system as fuel. In this case the hydrocarbon fuel gas rate could be quantified and the actual cost rate or reduced income could be calculated. In such a way, emission data and/or fuel rate cost may be determined for individual sub-process systems, quantified based on the actual power demand.

As is discussed further below, possible production income reduction due to malfunction or reduced performance of said sub-process systems may be quantified and used to evaluate if changes shall be made since the actual intervention or repair cost is normally (at least approximately) known.

The steps described as being done in real time may comprise some amount of time lag, i.e. they may not be totally instantaneous. It will be appreciated that truly real time processing is not practical and is not necessarily essential for the advantages of the invention to be realized. For instance, the determined/displayed values may be more than 0.1 s, 0.5 s or 1 s behind the actual state of the system, or may be less than 1 s, less than 0.5 s, or less than 0.1 s behind the actual state of the system. Real time data/information may be thought of as "live" data/information, as opposed to historic data/information that has been stored for a period of time before it is used.

The system may comprise a display for displaying information. The information may be the determined production value and/or the determined emissions, the measured parameters and/or the specified values, or any of the other values that may be determined by the processor as discussed below.

The display may be the same physical component as the input interface, i.e. there may be a single interface that displays information and where parameters, or instructions can be input.

The hydrocarbon production system may comprise one or more individual sub-process systems. The sub-process systems may be, or may comprise, individual components. A sub-process system may be, or may comprise, a pump, a compressor, a motor, a valve, a separator, a heat exchanger, a pipeline and/or a machine, etc.

The plurality of sensors may include a plurality of sub-process system sensors configured to measure a respective plurality of sub-process system measured parameters. The processor may be configured to determine the respective performances of the sub-process systems. These respective performances may be defined in terms of emissions (e.g. power consumption, or efficiency, or performance) and/or production value. The respective performances may be defined in terms of how the respective performances influence the overall emissions and/or production value of the hydrocarbon production system.

The plurality of sensors may be configured to provide the system with measured parameters in real time.

In this way, the present system can monitor and determine the performance or emissions or value associated with each sub-process system. This can provide a controller with a detailed level of information on the hydrocarbon production system. No such level of information is provided in current systems.

The display may be configured to display the respective determined production value, the determined emissions, the measured parameters and/or the specified values, and/or any other value determined by the processor, at respective locations on a schematic map of the hydrocarbon production system corresponding to the respective locations of the actual hydrocarbon production system to which said displayed information relates. The display may also display forecasts of items determined by the processor.

The specified parameters may include reservoir data (such as hydrocarbon composition, temperature and pressure), constants, hydrocarbon market price and/or efficiency numbers. The specified parameters may include any parameters that are required by the processor to accurately determine the equipment performance, system production value and/or emissions.

The measured parameters may include pressure and/or temperature of production fluid produced by the hydrocarbon production system at various locations in the hydrocarbon production system.

The processor may be configured to determine the actual fluid composition and properties of the production fluid at said various locations in the hydrocarbon production system using said pressure and/or temperature measurements.

In current systems, the actual fluid composition and properties of the production fluid are not known throughout the hydrocarbon production system. Currently, samples of the production fluid are sporadically taken at the topside/near the output of the hydrocarbon production system. These samples are then used to estimate the fluid composition upstream, and hence are used in the controller's decision-making. The present system improves this prior system as it allows the actual composition of the production fluid to be known in real time at various locations throughout the hydrocarbon production system. It is known that machinery such as compressors will change performance with the fluid composition and in prior systems such dependency is not shown due to lack of fluid composition data. In the present system, it is possible to determine how a sub-process system's performance changes with fluid composition.

The display may be configured to display the respective composition and properties of the production fluid on a schematic map of the hydrocarbon production system corresponding to the respective locations of the actual hydrocarbon production system to which said displayed information relates.

The measured parameters may include a wide variety of parameters. In essence, the measured parameters may comprise or consist of the parameters that are required in order to be able to accurately determine the sub-process system performance, production value and/or emissions of the hydrocarbon production system. The measured parameters may be measured and provided to the processor in real time.

For example, the measured parameters may include differential pressure across one or more individual sub-process systems (e.g. equipment, flow devices, pipelines or other parts) of the hydrocarbon production system. The differential pressure may be used to quantify flow rate, process performance, production loss and increased power and emission consumption. The differential pressure may be the differential pressure of the production fluid, and/or may be another fluid, such as a working fluid. Such sub-process systems may be any sub-process system or component discussed herein, but in particular a cooler, a heater, a compressor, a pump, a machine and/or a valve, and/or any component where the pressure or temperature or flow or composition may change over it.

Additionally/alternatively, the measured parameters may include flow rates of the production fluid at a plurality of locations of the hydrocarbon production system. These parameters may be measured at locations where fluid is flowing, such as through pipelines, pumps, compressors, valves, etc.

Additionally/alternatively, the measured parameters may include flow rates of another fluid (such as a working fluid) at a plurality of locations in the hydrocarbon production system. These parameters may be measured at locations where fluid is flowing, such as through pipelines, pumps, compressors, valves, etc.

Additionally/alternatively, the measured parameters may include fluid bulk density of the production fluid at a plurality of locations of the hydrocarbon production system. These parameters may be measured at locations where fluid is present, such as in pipelines, coolers, separators, pumps, compressors, valves, etc. The bulk density can be used to determine production fluid compositional data at locations where measured or specified pressure and temperature are provided.

Additionally/alternatively, the measured parameters may include fluid conductivity or salinity of the production fluid at a plurality of locations of the hydrocarbon production system. These parameters may be measured at locations where fluid is present, such as in pipelines, coolers, heaters, separators, pumps, compressors, valves, etc. These parameters may be measured to determine the composition of the fluid, for instance the water content.

Additionally/alternatively, the measured parameters may include gamma radiation measurements of the fluid. These parameters may be measured at locations where fluid is present, such as in pipelines, coolers, heaters, separators, pumps, compressors, valves, etc. These parameters may be measured to determine the composition of the fluid.

Additionally/alternatively, the measured parameters may include liquid hold-up. These parameters may be measured at locations where fluid is present, such as in pipelines, coolers, heaters, separators, pumps, compressors, valves, etc.

Additionally/alternatively, the measured parameters may include valve position of one or more valves of the hydrocarbon production system.

Additionally/alternatively, the measured parameters may include machine data (such as rotating machinery rotating speed, electrical current and/or voltage, shaft position, electrical insulation resistance) of one or more machines of the hydrocarbon production system.

Additionally/alternatively, the measured parameters may include power consumption or emission data of one or more powered components of the hydrocarbon production system. This can be found in a number of ways, as is discussed below. Power may be consumed in the hydrocarbon production system by sub-process systems such as pumps, compressors or utility systems.

Additionally/alternatively, the measured parameters may include energy/power loss over one or more components of the hydrocarbon production system. This can be found in a number of ways, as is discussed below. Power may be lost in the hydrocarbon production system in power cables, variable speed drives, transformers and other types of equipment. Energy may also be lost in fluid heat losses and pressure drops through components, such as pipelines, valves, separators, coolers, heaters, etc.

Additionally/alternatively, the measured parameters may include emission data from one or more energy sources of the hydrocarbon production system. The energy source may be an electrical generator that is powered by hydrocarbon fuel. This emission data can be found by measuring emissions directly (such as $CO_2$ and/or $NO_x$ emissions from the energy source) and/or from fuel consumption of the energy source.

Additionally/alternatively, the measured parameters may include market value of the production fluid, such as current oil and/or gas prices.

No prior art systems use such measured parameters at a plurality of locations throughout the hydrocarbon production system to calculate emissions and/or production value in real time.

There may be more than 500, 1000, 2000, 3000, 4000 or 5000 sensors measuring more than 500, 1000, 2000, 3000, 4000 or 5000 respective measured parameters. The present system may advantageously use a large number of measured parameters in order to accurately determine the emissions and/or production value and/or fluid composition, flow rate, etc. throughout the hydrocarbon production system. Hence, a detailed level of information can be obtained and provided to a controller, which is beneficial for optimized hydrocarbon production system control. For instance, the large numbers of measured parameters can be used to determine the emission and production value contributions from each of the sub-process systems in the hydrocarbon production system.

The processor may make use of more than 500, 600, 700 or 800 mathematical relationships (i.e. equations). These relationships may be used to determine the sub-process systems' performances, production value and/or emissions of the hydrocarbon production system, and possibly the other information such as fluid composition, in real time based upon the measured parameters and the specified parameters. The present system may advantageously use a large number of equations, in which the measured parameters and specified parameters are used, in order to accurately determine the emissions and/or production value and/or fluid composition, flow rate, etc. throughout the hydrocarbon production system. Hence, a detailed level of information can be obtained and provided to a controller (either directly or via a display), which is beneficial for optimized hydrocarbon production system control. For instance, the large numbers of measured equations can be used to determine the emission and production value contributions from each of the sub-process systems in the hydrocarbon production system.

The hydrocarbon production system may comprise one or more components that are cooled or heated by a working fluid. These components may be, for example, produced hydrocarbon fluid, motors, machines, pumps and/or compressors with auxiliary systems such as bearing fluids, etc.

The measured parameters may include fluid data of the working fluid. The fluid data may comprise pressure, temperature, flow rate and/or composition. The processor may be configured to determine the efficiency of said one or more components that are cooled or heated by the working fluid from said measured fluid data. The efficiency of said one or more components can be determined by determining the energy removed from said one or more components (known from the increase in energy of the working fluid). The energy changes in the fluids can be calculated from thermodynamic relationships, such as fluid enthalpy or fluid heat capacity, based on the temperature, pressure, flow rates and composition of the fluids. Thus, the energy removed from or added to said one or more components can be determined from the temperature measurements of the working fluid, and possibly by knowing the pressure and/or the composition of the working fluid (which can be specified, measured or determined).

The hydrocarbon production system may comprise one or more components that act on the production fluid. These components may be, for example, motors, machines, pumps, and/or compressors, etc. Since these components act on the production fluid, they may change the energy of the production fluid. These components may also be cooled or heated by the working fluid as discussed above.

The measured parameters may include fluid data of the production fluid. The fluid data may comprise pressure, temperature, flow rate and/or composition. The processor may be configured to determine the efficiency of said one or more components that act on the production fluid from said measured fluid data. The efficiency of said one or more components can be determined by determining the energy change in the production fluid due to it passing through said one or more components (e.g. when it the fluid is compressed, its energy may increase). The energy changes in the fluids can be calculated from thermodynamic relationships, such as fluid enthalpy or fluid heat capacity, based on the temperature, pressure, flow rates and composition of the fluids. Thus, the energy change due to the production fluid passing through said one or more components can be determined from the temperature measurements of the production fluid, and possibly by knowing the pressure and/or the composition of the production fluid (which can be specified, measured or determined).

Here, the efficiency may be equally thought of as the performance of the component, or possibly even purely the energy consumed by the component (and hence the emissions of the component).

The hydrocarbon production system may comprise one or more sub-process systems, such as individual components. These sub-process systems may consume energy, i.e. they may be powered (e.g. by electricity) from an energy source (e.g. an electrical generator or directly from a turbine).

The measured parameters may include energy supplied to said one or more sub-process systems. The processor may be configured to determine the efficiency of said one or more sub-process systems from said measured energy supplied to said one or more sub-process systems. From the measured energy supplied, the energy consumption can be found, from which the efficiency can be found.

The energy supplied to the one or more sub-process system may actually be determined from more basic measurements, such as current, voltage and time.

Again, here, the efficiency may be equally thought of as the performance of the component, or possibly the theoretical work determined compared to the actual energy consumed by the component, or possibly even purely the energy consumed by the component (and hence the emissions of the component).

For the case where the sub-process system both consumes energy (i.e. it is powered) and changes the energy of the production fluid passing through it, the energy consumed by the sub-process system (i.e. the input energy) and the energy imparted by the sub-process system on the production fluid (i.e. the useful output energy) can be determined by the processor as discussed above. These two values can be compared to one another to determine the efficiency of the sub-process system.

If the production fluid rate and composition is known of the production fluid (and/or the working fluid, or any other fluid), the actual heat energy work performed by machinery can be compared to the energy consumed (i.e. input energy). From this comparison, it is possible to check that the fluid data of the production fluid, particularly the production fluid composition, is correct. Indeed, it could be thought of that the fluid data of the production fluid can be calculated from the energy consumption known from the energy supplied to the sub-process system.

For instance, where three of four fluid data parameters (i.e. the pressure (before and after the sub-process system); the flow rate (before and after the sub-process system); the temperature (before and after the sub-process system); and the fluid composition) are measured, and where the energy consumption is measured/determined, the fourth of fluid data parameter can be determined. The unknown fluid data parameter is typically the fluid composition as this is hardest to measure.

However, for a hydrocarbon fluid produced from a well, the processed composition parameters can give the gas-liquid fraction at specified pressure and temperature that could be compared to actual gas-liquid fractions determined from mass flow rates measured downstream any separation process.

For the case where the sub-process system both consumes energy (i.e. it is powered) and is heated or cooled by a working fluid passing through it, the energy wasted by the sub-process system (i.e. the wasted heat energy in the working fluid) and the energy given to the sub-process system (i.e. from the energy source) can be determined by the processor as discussed above. These two values can be compared to one another to determine the efficiency of the sub-process system. If the efficiency of the sub-process system is known, then these two values can be compared to one another to check that the fluid data of the working fluid, particularly the working fluid composition, is correct. Indeed, it could be thought of that the fluid data of the working fluid can be calculated from the energy consumption known from the energy supplied to the sub-process system.

For instance, where three of four fluid data parameters (i.e. the pressure (before and after the sub-process system); the flow rate (before and after the sub-process system); the temperature (before and after the sub-process system); and the fluid composition) are measured, and where the energy consumption is measured/determined, the fourth of fluid data parameter can be determined. The unknown fluid data parameter is typically the fluid composition as this is hardest to measure.

For the case where the sub-process system both consumes energy (i.e. it is powered), changes the energy of the production fluid passing through it, and is heated or cooled by a working fluid passing through it, the energy wasted by the sub-process system (i.e. the wasted heat energy in the working fluid), the energy imparted by the sub-process system on the production fluid (i.e. the useful output energy), and the energy given to the sub-process system (i.e. from the energy source) can be determined by the processor as discussed above. These three values can be compared to one another to determine the efficiency of the sub-process system. In essence, the sum of the energy changes to the working (heating or cooling fluid) and production fluids should equal the input energy. These three values can also be compared to one another to check that the fluid data of the working fluid, particularly the cooling and/or production fluid composition, is correct. Indeed, it could be thought of that the fluid data can be calculated from the energy consumption known from the energy supplied to the sub-process system.

Thus, the fluid data of the working and/or production fluid can be calculated or validated from the energy consumption of the sub-process system. Thus, the fluid data (e.g. pressure, temperature and/or composition) of the working and/or production fluid can be checked/determined at the relevant location in the hydrocarbon production system (i.e. the location in the vicinity of the sub-process system).

In conventional systems, this validation/determination of the fluid data from energy consumption is not performed. It is difficult to measure fluid data at different locations throughout the hydrocarbon production system (particularly fluid composition). The present system allows this to occur. The present system can effectively determine or validate processed fluid composition by balancing energy relationships (e.g. the thermodynamic energy changes of a fluid passing through a sub-process system and the energy supplied to that sub-process system), and measurements of pressure, temperature and/or flow rate of said fluid.

The hydrocarbon production system may comprise one or more sub-process systems, such as individual components. These sub-process systems may operate at variable speeds and/or may consume variable amounts of power.

The measured parameters may include operating speed and/or power consumption of said one or more sub-process systems. A relationship between operating speed and/or power consumption and efficiency may be known (e.g. predicted, calibrated, provided, input via said input means) for said one or more sub-process systems. The processor may be configured to determine the efficiency of said one or more sub-process systems from said measured operating speed and/or power consumption and said relationship.

Again, here, the efficiency may be equally thought of as the performance of the component, possibly predicted theoretical energy of the fluid work compared to the actual work performed, or even purely the energy consumed by the component (and hence the emissions of the component).

This determined efficiency can be used along with the measured energy consumption and the measured fluid data parameters (discussed extensively above) to determine/validate the fluid data of the working fluid and/or production fluid in the vicinity of the one or more sub-process systems.

The display may be configured to display the efficiencies (or performances) of the one or more sub-process systems. The efficiencies may be displayed on a schematic map of the hydrocarbon production system corresponding to the respective locations of the actual hydrocarbon production system to which said displayed information relates.

Where the processor actually determines the fluid data (e.g. the pressure, the temperature, the flow rate and/or the composition, but preferably the composition) of the working fluid and/or production fluid from the energy change(s) in the fluid(s) across the sub-process system and the energy input into the sub-process system, the display may be configured to display the determined fluid data of the one or more sub-process systems. The fluid data may be displayed on a schematic map of the hydrocarbon production system corresponding to the respective locations of the actual hydrocarbon production system to which said displayed information relates.

The system may comprise a controller. The controller may be part of the processor or may comprise another processor. The controller may alternatively be a human operator to which the displayed information is provided. The controller may be able to control the hydrocarbon production system in light of the determined values determined by the processor (e.g. the efficiencies, the emissions and/or the production values, etc.). Thus the control of the hydrocarbon production system may be manual or automatic. The control of the hydrocarbon production system could be switched between manual and automatic.

When the system comprises a controller, the system for providing information on production value and/or emissions may be thought of (either additionally or alternatively) as a system for controlling the hydrocarbon production system (based at least in part on said provided (or determined) information on production value and/or emissions).

The processor may be configured to determine, using the efficiency of said one or more sub-process systems, whether repair and/or replacement of said one or more sub-process systems would improve the overall production value and/or emissions of the hydrocarbon production system.

The processor may be configured to carry out further steps in order to forecast future values for any item that is determined as discussed above. For example, the processor may be arranged to extrapolate or predict future trends and/or values based on the determined real time values and/or on previous trends. Such forecasts can be used to augment information provided about the real time production value and/or emissions.

The display may output this information and may optionally also output forecasts of future trends in that information or future values of the information.

Alternatively/additionally, the display may merely output the efficiency of said one or more sub-process systems, and the controller (e.g. a human operator) can determine whether or not replacement or repair would be beneficial in terms of overall production value and/or emissions.

Replacement or repair would likely include down-time of the hydrocarbon production system, and may have a cost in terms of emissions and/or production value in addition to cost of repair parts or spare equipment used. These factors may also be considered when determining whether replacement or repair of said one or more sub-process systems is beneficial.

Again, these steps are not performed in any prior art system. Quantifying whether repair or replacement of components is beneficial in terms of overall emissions and/or production value of the system is advantageous in order to optimize the operation of the hydrocarbon production system.

The controller may be the same physical component as the display and/or the input interface, i.e. there may be a single interface that displays information and where parameters, or instructions can be input.

The hydrocarbon production system may comprise a plurality of wells. The processor may be configured to determine the flow rate for each well from the measured parameters, and/or the specified parameters. The measured parameters, and/or the specified parameters, may be such that the processor is able to determine the flow rate for each well from the measured parameters, and/or the specified parameters.

The display may be configured to display the respective flow rates for each well. These may be displayed on a schematic map of the hydrocarbon production system corresponding to the respective locations of the actual hydrocarbon production system to which said displayed information relates.

The controller may be configured to control the components of the hydrocarbon production system based at least in part on the determined flow rates for each well. In the case where the controller is a human operator, the displayed information allows the human operator to make educated, informed decisions when controlling the hydrocarbon production system, especially with a view of optimizing emissions and/or production value. In the case where the controller is an automated control, said determined information can be used in an automated decision-making process by the controller.

The processor may be configured to determine the amount of water saturated in the production fluid from the measured parameters, and/or the specified parameters. The measured parameters, and/or the specified parameters, may be such that the processor is able to determine the amount of water saturated in the production fluid from the measured parameters, and/or the specified parameters. The amount of water saturated in the production fluid may be determined at reservoir conditions, and/or at conditions at locations downstream of the reservoir within the hydrocarbon production system. As with all the determined values of the present system, this may be done in real time.

Water may be present in the production fluid produced from a reservoir. The composition of the production fluid at the well/reservoir may be found at a given time by taking a test sample. The composition may include $N_2$, $CO_2$, water and different hydrocarbon compounds. The amount of water saturated in the reservoir (and hence produced in the production fluid from the reservoir through the well) depends on the temperature and the pressure of the reservoir (i.e. the dew point depends on the temperature and the pressure). The temperature of the reservoir is typically constant over time. However, the pressure changes (typically decreases) as the production proceeds. Thus, as the reservoir conditions change over time, the amount of water saturated in the production fluid at reservoir conditions changes over time, and hence the amount of water in the produced fluid changes over time. Typically the hydrocarbon reservoir fluid is able to contain more humidity or water as the pressure decreases (since the reservoir stays at substantially a constant temperature over time), i.e. the water mass flow rate inside the production fluid increases relative to the hydrocarbon fluid mass flow rate.

The reservoir pressure may be determined as the production from the well is stopped (normally by closing a valve located inside the X-tree at the sea floor) and as no fluid movement takes place in the well tubing, no pressure loss is present, so the pressure measured (shut-in pressure) close to the X-tree could serve as an input for calculation of the actual reservoir pressure, just adding the contribution of the hydrostatic fluid column from the X-tree to the reservoir (typically 1000-3000 m height). Alternatively, the pressure measured in the well tubing at the reservoir could be used if such measurements exist. The reservoir temperature, typically constant over time, could be specified as a constant determined from measurements or reservoir models, or alternatively a measured temperature could be used if such sensor is applied close to the reservoir.

It is desirable to know the amount of water in the production fluid. The production fluid is saturated with water vapor at the reservoir condition (i.e. at the actual pressure and temperature in the reservoir). Downstream of the reservoir in the hydrocarbon production system, conditions may change relative to the reservoir conditions (i.e. the pressure and temperature may change). This may lead to water condensation as the production fluid's ability to contain water vapor changes. Such a combination of hydrocarbons and liquid water molecules may react and form hydrates. This is undesirable since the hydrate formed is a solid that may increase in size until it is blocking the entire pipeline and the production fluid cannot reach the production facility.

In order to counter the formation of hydrates, typically an anti-hydrate formation agent (e.g. glycol) is added to the fluid. The mixing ratio between the free liquid water and anti-hydrate formation is very important. The mixing ratio between the anti-hydrate formation agent (glycol) and the Aqueous phase (glycol and water) is typically 60% on a weight basis.

Thus, from A) a known starting hydrocarbon fluid composition from the reservoir (found by taking a sample), and B) identifying actual pressure and temperature inside the reservoir (well shut-in condition), and C) water saturating the production fluid hydrocarbon fluid at the reservoir condition, and D) by tracking how measured parameters (such as pressure and temperature) change over time (possibly at various locations throughout the reservoir and/or hydrocarbon production system), the water rate and the corresponding amount of anti-hydrate formation agent (e.g. glycol) to be added to the fluid at one or more locations in the hydrocarbon production system in order to avoid hydrate formation can be determined by the processor. This can be determined in real time.

This information (e.g. the necessary anti-hydrate formation agent amounts and/or the amount of water in the production fluid at reservoir conditions and/or at locations throughout the hydrocarbon production system) can be displayed on the display. This displayed information can then be used by a controller (e.g. a human operator) to control the hydrocarbon production system (e.g. control anti-hydrate formation agent amounts) to reduce hydrate formation, and/or with a view of optimizing emissions and/or production value.

Additionally/alternatively, where the controller is an automated controller, the determined water amounts and/or the anti-hydrate formation agent amounts can be provided from the processor to the controller in order to control the hydrocarbon production system (e.g. to control the anti-hydrate formation agent amounts in the hydrocarbon production system).

Thus, the processor (and/or the controller (which may be a human operator or an automated controller) may be configured to use the amount of water in the production fluid to determine how much glycol to add to the production fluid to prevent hydrate formation, and whether adding said glycol would improve production value and/or emissions.

For production systems where the measured parameters include the real time water rate (typically a multiphase flow device), the determined water rate may be compared to the measured water rate and any deviation could be used as a warning of free liquid water entering the hydrocarbon production fluid inside the reservoir (known as water break through). Such free water break-through inside the reservoir is typically denoted produced water and may also be detected by increased liquid conductivity if such real-time measurement is available from conventional probes or by manual samples taken from the produced fluid.

The system may comprise a plurality of sub-process systems (e.g. individual components). The emissions may comprise (or may consist of) the emissions of the hydrocarbon production system as a whole and/or the emissions of the respective sub-process systems. The emissions of the individual sub-process systems can be found from measuring their performance, efficiency and/or energy consumption, etc. as discussed in detail above.

The emissions of the hydrocarbon production system may comprise (or consist of) the emissions of each sub-process system (or component) in the hydrocarbon production system where energy may be lost. These sub-process systems (or components) may be powered, but they need not be powered. For example, there may be emissions associated with energy loss locations in the hydrocarbon production system, e.g. locations where pressure may be lost in the fluid. Such pressure loss could take place due to fluid friction in inside the production system, typically in pipelines, coolers, heaters, valves, etc. These may be summed to find the total emissions of the hydrocarbon production system, as any pressure drop inside the production system, may be compensated by use of a pressure increase device such as a compressor and/or pump that requires power input. The emissions herein can be thought of as being equivalent to energy consumption and/or energy loss.

Changing the production fluid resistance to flow (pressure drop) may also change the production value and/or emissions, depending on the working power input applied to the production fluid in the process system. For example, where there is a pressure drop over a valve, this may have an energy loss and hence a "production value" and/or "emission" figure related to it. For instance, if the pressure drop were reduced, the wasted energy would be reduced. As the system input power required is reduced this could have a direct effect on the emissions (from the power generation source). Alternatively, if the pressure drop were reduced, since less power is required for a given production fluid flow rate, the controller could also select to utilize the power saving, or part of it, in increasing the production fluid flow rate and hence the production value).

The determined emissions of each sub-process system may be thought of as the contribution each sub-process system makes to the overall emissions of the hydrocarbon production system. By determining the emissions associated with each sub-process system, information is available to a controller to optimize said sub-process system with a view of optimizing (e.g. minimizing) the overall emissions of the hydrocarbon production system (whilst also possibly seeking to optimize the overall production value of the hydrocarbon production system).

Additionally/alternatively, the emissions of the hydrocarbon production system may be the total emissions of the system as a whole.

The display may be configured to display the respective emissions for each sub-process system. These may be displayed on a schematic map of the hydrocarbon production system corresponding to the respective locations of the actual hydrocarbon production system to which said displayed information relates.

The controller may be configured to control the components of the hydrocarbon production system based at least in part on the emissions. In the case where the controller is a human operator, the displayed information allows the human operator to make educated, informed decisions when controlling the hydrocarbon production system (e.g. controlling the respective sub-process systems), especially with a view of optimizing emissions and/or production value. In the case where the controller is an automated control, said determined information can be used in an automated decision-making process by the controller (e.g. to control the respective sub-process systems).

The production value of the hydrocarbon production system may comprise the production value at a plurality of different locations throughout the system, e.g. the production value associated with each sub-process system. Additionally/alternatively, the production value of the hydrocarbon production system may be the total production value of the system as a whole.

The flow rate and composition of the production fluid may vary throughout the hydrocarbon production system, e.g. due to changes in conditions such as pressure and temperature. Thus, not only may the overall output hydrocarbon production value of the hydrocarbon production system as a whole be determined, but also an effective hydrocarbon production value of the hydrocarbon production system may be calculated at different locations throughout the hydrocarbon production system. These locations may be locations where the production value of the hydrocarbon production system may be changed or affected (e.g. at sub-process systems, such as valves, or pumps, or compressors, etc.).

The production value of each the sub-process systems may be represented by, or may give an indication of, production value loss caused by said sub-process system.

The determined production value of each sub-process system may be thought of as the contribution each sub-process system makes to the overall production value of the hydrocarbon production system (or indeed the contribution each sub-process system makes to the loss in production value). By determining the production value associated with each sub-process system, information is available to a controller to optimize said sub-process system with a view of optimizing the overall production value of the hydrocarbon production system (whilst also possibly seeking to optimize the overall emissions of the hydrocarbon production system).

The display may be configured to display the respective production values for each location. These may be displayed on a schematic map of the hydrocarbon production system corresponding to the respective locations of the actual hydrocarbon production system to which said displayed information relates.

The controller may be configured to control the components of the hydrocarbon production system based at least in part on the production value(s). In the case where the controller is a human operator, the displayed information allows the human operator to make educated, informed decisions when controlling the hydrocarbon production system (e.g. controlling the respective sub-process systems), especially with a view of optimizing emissions and/or production value. In the case where the controller is an automated control, said determined information can be used in an automated decision-making process by the controller (e.g. to control the respective sub-process systems).

As has been discussed above, the hydrocarbon production system may comprise a controller configured to control the hydrocarbon production system based at least in part on the determined production value and/or the emissions of the hydrocarbon production system. The controller may control the hydrocarbon production system also based upon the other determined values, such as the flow rates, performances/efficiencies, power consumptions, and/or water levels, etc., determined by the processor from the specified parameters and the measured parameters. The controller may be automated controller, or may be a control having an input for operation by a human operator.

The processor may be configured to determine, and possibly evaluate, the changes to the emissions and/or the production value of the hydrocarbon production system in light of any changes to the operation of the hydrocarbon production system, e.g. changes made by the controller. The processor may be configured to determine future trends in the emissions and/or the production value based on proposed changes to the operation of the hydrocarbon production system.

As has been discussed above, the system may comprise a display configured to display the values determined by the processor, such as the production value(s), the determined emission(s), the measured parameters, the specified values, the determined flow rate(s), the determined efficiency(ies), the determined amount(s) of water saturated in the production fluid, the glycol supply rate(s), the determined flow rate(s) and/or forecasts for the values determined by the processor. The display may be updated in real time.

Said displayed values may be displayed at respective locations on a schematic map of the hydrocarbon production system corresponding to the respective locations of the actual hydrocarbon production system to which said displayed information relates.

Such a display allows an operator to have an educated, up-to-date and detailed view of the function and performance of the hydrocarbon production system. This allows the operator to make educated and intelligent decisions, with a view of optimizing the emissions and/or production value, when controlling the operation of the hydrocarbon production system. In conventional systems, not such information is provided to an operator. The operator is therefore not able to make such educated, informed decisions on the hydrocarbon production system's operation.

The processor may be configured to output information. Said information comprises information relating to the real time state of the system and may optionally also comprise forecasts about the future state of the system. The information may be the determined values determined by the processor. Additionally/alternatively, said information may be an instruction to a controller of the system to perform an operation to alter the operating state of the system (e.g. to alter the operation and/or state of one or more of the sub-process systems). As discussed above, the controller may be human operator, an input device for inputting control instructions from a human operator and/or an automated controller.

Thus, the information provided to the controller may simply be an indication of the production value and/or emissions of the hydrocarbon production system. However, it may also be an instruction to the controller to alter the operation of the hydrocarbon production system, e.g. by altering the operation of one or more of the sub-process systems, to optimize the production value and/or the emissions. The information may provide a comparison of how the current production value and/or emissions of the system compares to previous production value(s) and/or emissions, or the maximum possible production value and/or emissions. The information may provide the controller an opportunity to learn how to best control the system to optimize production value and/or emissions.

As has been discussed above, the information may be provided in real time. The measurement of the parameters also may also occur in real time.

The information provided to the controller (and/or the display) may be low resolution data. Low resolution data is produced by processing the raw data/values determined by the processor and/or the raw measured parameters to a useful format for use by the controller, typically 1 Hz data resolution or less. The high resolution data (e.g. the non-processed "raw" determined values and/or measured parameters) may also be available if required. For example, the measured parameters and determined values larger than 1 Hz resolution, 10 Hz resolution, 100 Hz resolution, 1000 Hz resolution or 10000 Hz resolution (for instance the high resolution data determined by the processor and provided to the processor from the measured parameters and/or the specified parameters may be typically from 10 to 14 000 Hz) which is normally limited by the instrument signal resolution. The low resolution data is more "user friendly" than the high resolution data for viewing performance of the hydrocarbon production system.

The information may be conveyed to the controller and/or the display via a communication network, such as the internet. The input device may be in communication with the processor over a communication network, such as the internet. The processor may be in communication with the sensors over a communication network, such as the internet. This allows the controller, the display, the processor and/or the input interface to be distant from the hydrocarbon control system, and possibly distant from each other too. This also allows numerous operators to view the information at different locations, possibly all over the world. Preferably, it is the low resolution information that is transmitted (only), but high resolution information can be transmitted if required/asked for.

As has been discussed above, efficiency/performance of the sub-process systems may reduce over time. Maintenance or online cleaning may therefore be required. The information can indicate to, or instruct, the controller if maintenance (e.g. repair or replacement) of a component would be net beneficial to the production value and/or emissions of the system. Where a forecast is determined then the information may include a prediction of future maintenance requirements. This may be done by comparing the actual loss (in terms of emissions and/or production value) of the sub-process system operating with reduced efficiency or performance (which could be a higher pressure drop or increased power consumption, etc.), and the cost of the component itself and/or the loss in production if the repair or maintenance or cleaning will have an impact on the sub-process system capacity.

Sub-process system degradation can be seen through reduced production income value, creating a basis for maintenance decisions, and for optimizing the operation of the process system value production.

In a second aspect, the invention provides a hydrocarbon production system comprises any of the systems for providing information on production value and/or emissions as set out in the first aspect.

In a third aspect, the invention provides a method of providing information on production value and/or emissions of a hydrocarbon production system, wherein a plurality of measured parameters of the hydrocarbon production system are provided and wherein a plurality of specified parameters are provided, the method comprising: determining the production value and/or emissions of the hydrocarbon production system in real time based upon the measured parameters and the specified parameters.

The method can comprise performing any of the steps discussed in relation to the first or second aspects. For instance, the method can comprise performing any of the measuring steps or determining steps or evaluating steps, or any other step, mentioned above. For instance, the method can comprise performing any of the steps mentioned above performed by the processor and/or the controller.

The method may comprise using any of the features discussed in relation to the first or second aspects.

In a fourth aspect, the invention provides a computer program product comprising computer-readable instructions that, when run on a computer, is configured to perform any of the method steps of the third aspect.

In a fifth aspect, the invention provides a method of producing hydrocarbons, comprising: performing any of the methods of the third aspect and/or using any of the systems of first and/or second aspect and/or the computer program product of the fourth aspect; and producing hydrocarbons.

BRIEF DESCRIPTION OF THE DRAWINGS

Certain preferred embodiments will now be described by way of example only and with reference to the accompanying drawings, in which.

DETAILED DESCRIPTION OF THE INVENTION

Figure 1:
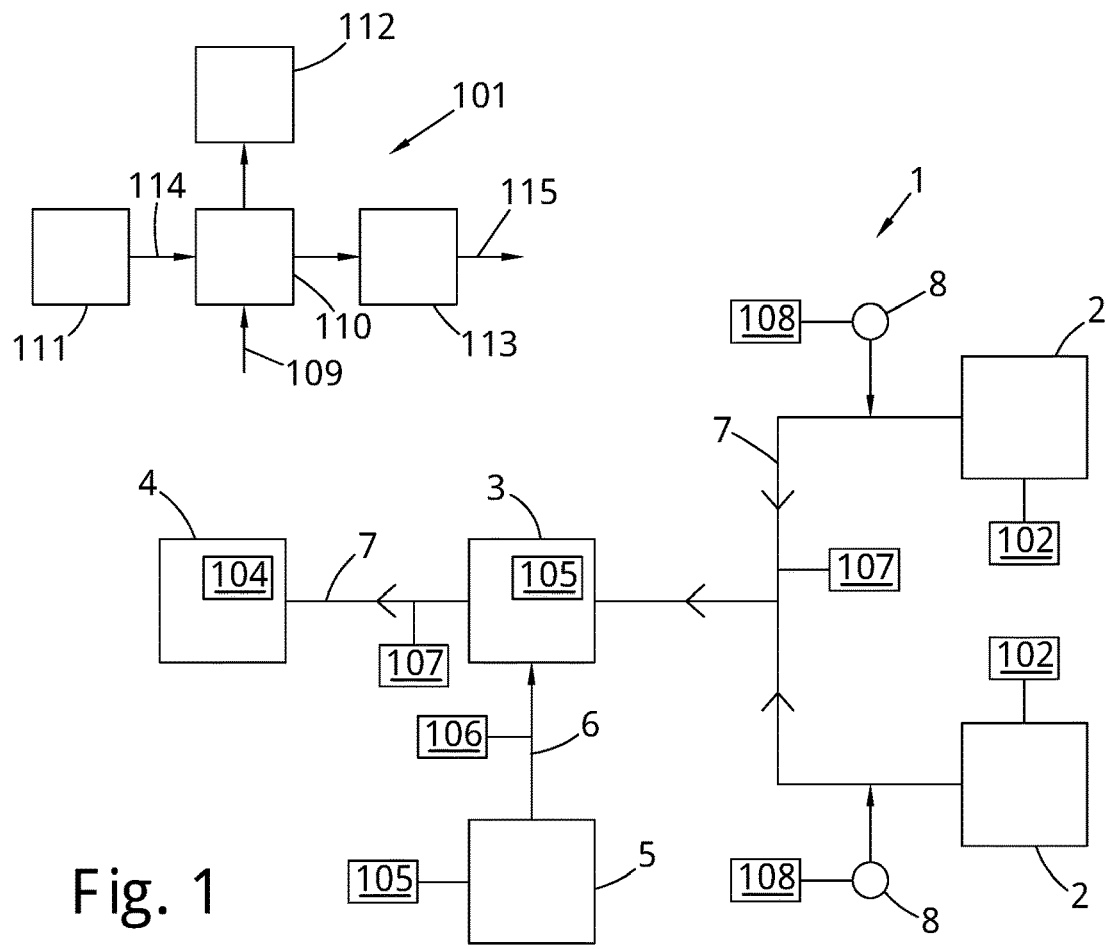
FIG. 1 shows a schematic view of a hydrocarbon production system and a system for providing information on production value and/or emissions of the hydrocarbon production system according to an embodiment of the present invention.

FIG. 1 shows a schematic simplified version of a hydrocarbon production system 1. The hydrocarbon production system 1 comprises a plurality of wells 2, at least one sub-process system 3 downstream of the wells 2 and an output 4 downstream of the sub-process system 3. In reality there may be numerous sub-process systems, comprising numerous components such as pipelines, compressors, scrubbers, pumps, heat exchangers, pipelines, energy cables, valves, motors, separators, machines and/or anti-hydrate forming sources, etc. The sub-process system 3 is connected to an electrical power source 5 via a power transmission line 6. There may also be transformers and variable speed drives and rectifiers between the electrical power source 5 and the sub-process system 3. The wells 2, the sub-process systems 3 and the output 4 are connected via lines 7 through which the produced fluid from the wells 2 flow. Downstream of each well 2 is a glycol source 8 that can add variable amounts of glycol into the produced fluid to prevent hydrate formation. The glycol source 8 may be thought of as a specific type of sub-process system.

The hydrocarbon production system 1 may be onshore or offshore. The sub-process systems 3 are housed in or on the Earth's surface. When the system is offshore, the output 4 is topside. The output 4 may be where produced hydrocarbons are output to a transportation pipeline or a vessel.

FIG. 1 also shows a schematic view of a system 101 for providing information on production value and/or emissions of a hydrocarbon production system 1. The system 101 comprises a plurality of sensors 102, 103, 104, 105, 106, 107 configured to measure a respective plurality of measured parameters 109 of the hydrocarbon production system 1; an input interface 111 for inputting a plurality of specified parameters 114 into the system 101; and a processor 110 configured to determine the production value and/or emissions of the hydrocarbon production system in real time based upon the measured parameters 109 and the specified parameters 114.

As is shown schematically in FIG. 1, the measured parameters 109 from the sensors 102, 103, 104, 105, 106, 107 and the specified parameters 114 from the input interface 111 are input to the processor 110.

The system 101 comprises a display 112 for displaying information. The displayed information may be the determined production value and/or the determined emissions, the measured parameters and/or the specified values, or any of the other values that may be determined by the processor as discussed below.

The system comprises a controller 113. The controller 113 may be an automated processor or a human operator to which the displayed information is provided. The controller 113 is able to control the hydrocarbon production system 1 via a control signal 115 in light of the determined values determined by the processor 110 (e.g. the efficiencies, the emissions and/or the production values, etc.).

The plurality of sensors comprises sensors for measuring parameters that can be used to indicative of the efficiency, performance, emissions and/or production value of the hydrocarbon production system as a whole, the wells (sensors 102), the sub-process systems (sensors 103), the output (sensors 104), the energy source (sensors 105), the power transmission (sensors 106), the fluid lines (sensors 107) and/or the glycol source (sensors 108).

The plurality of sensors 102, 103, 104, 105, 106, 107 are configured to provide the system 101 with measured parameters 109 in real time.

The display 112 is configured to display the respective determined production value, the determined emissions, the measured parameters and/or the specified values, or any other value determined by the processor, at respective locations on a schematic map of the hydrocarbon production system 1 corresponding to the respective locations of the actual hydrocarbon production system 1 to which said displayed information relates. For instance, the schematic map may look similar to the schematic diagram of FIG. 1, and the specified, measured or determined values may be shown at the appropriate locations throughout the schematic map, e.g. adjacent the components to which they relate.

The measured parameters 109 include: differential pressure across one or more individual sub-process systems 3; flow rates of the production fluid at a plurality of locations of the hydrocarbon production system 1; flow rates of a working fluid at a plurality of locations in the hydrocarbon production system 1; fluid bulk density of the production fluid at a plurality of locations of the hydrocarbon production system 1; conductivity or salinity of the production fluid at a plurality of locations of the hydrocarbon production system 1; liquid hold-up; valve position of one or more valves of the hydrocarbon production system 1; machine data of one or more machines of the hydrocarbon production system 1; power consumption or energy loss of one or more powered components 3 of the hydrocarbon production system 1; energy/power loss over one or more components of the hydrocarbon production system 1; emission data from one or more energy sources 5 of the hydrocarbon production system; market value of the production fluid, such as current oil and/or gas prices.

Figure 2:
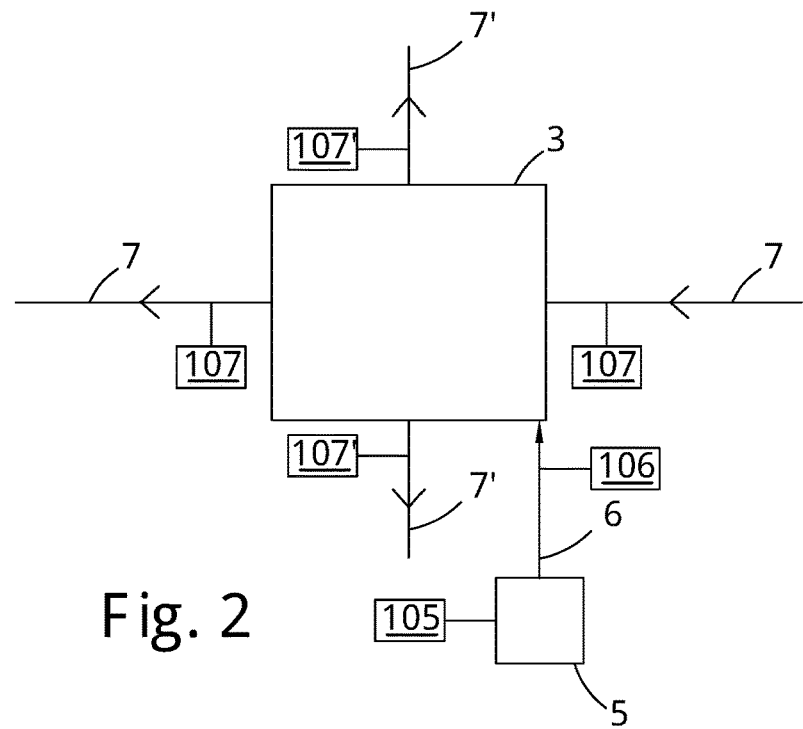
FIG. 2 shows a more detailed view of an exemplary sub-process system that may form part of the hydrocarbon production system of FIG. 1.

FIG. 2 shows an exemplary sub-process system 3 that is both powered by an energy source 5 and is cooled by a working fluid 7', which is preferably a cooling fluid.

The measured parameters 109 include the temperature, flow rate and/or pressure of the working fluid 7' before and after cooling the sub-process system 3, from sensors 107'. The composition of the working fluid 7' may be known, measured or specified.

The processor 110 is configured to determine the energy change in the working fluid 7' from the temperature, flow rate, pressure and/or composition values. The energy increase in the working fluid 7' can be thought of as wasted energy and hence the performance/efficiency of the component 3 can be found from this energy change, particularly by comparing this wasted energy to input energy measured using sensors 105 and 106.

The measured parameters 109 include the temperature, flow rate and/or pressure of the production fluid 7 before and after passing through the sub-process system 3, from sensors 107. The composition of the production fluid 7 may be known, measured or specified.

The processor 110 is configured to determine the energy change in the production fluid 7 from the temperature, pressure, flow rate and/or composition values. The energy change in the production fluid 7 can be used in combination with the energy change in the working fluid 7' and/or the measured input energy from the energy source 5 to determine the performance/efficiency of the component 3.

The measured parameters 109 include energy supplied to said sub-process system 3 from energy source 5 via power transmission 6.

The processor 110 is configured to determine the efficiency/performance/energy consumption of said one or more sub-process systems from said measured energy supplied to said sub-process system 3. From the measured energy supplied, the energy consumption can be found, from which the efficiency can be found, particularly when the energy consumption is compared to the wasted energy in the working fluid 7' and/or the useful energy change in the production fluid 7.

In essence, the sum of the wasted energy imparted by the sub-process system 3 to the working fluid 7' and the useful energy imparted by the sub-process system 3 to the production fluid 7 should equal the total input energy input into the sub-process system 3 from the energy source 5.

Thus, from the energy consumption of the sub-process system 3 (known from measuring the power used from the energy source 5), from the energy change in the working fluid 7' passing through said sub-process system 3, and from the energy change in the production fluid 7 pass through said sub-process system 3, the efficiency of the sub-process system 3 can be found.

Further, since the energy changes in the fluids 7, 7' and the energy consumption from the energy source 5 are determined using completely independent calculations, these values can be compared to one another to try to ensure they are all correct. In essence, the power consumption of the sub-process system should be equal to the sum of the energy changes of the working and productions fluids 7, 7' passing through the sub-process system.

Indeed, the processor 110 can compare the energy consumption calculated from the fluids 7, 7' and the energy consumption measured from the energy source 5. Since these energy consumptions should be equal, the processor 110 can determine if the fluid data (e.g. the pressure, temperature, flow and/or the composition), in particular the composition which can be difficult to measure using sensors, is correct.

Indeed, the processor 110 can calculate the fluid composition from the energy consumption measured from the energy source 5, and the other sensed fluid data (such as change in pressure, temperature and/or flow rate over the sub-process system). This finds the fluid composition, of either or both of the working fluid 7' and the production fluid 7, in the vicinity of the sub-process system.

The sub-process systems 3 may operate at variable speeds and/or may consume variable amounts of power. The measured parameters 109 can include operating speed and/or power consumption of said sub-process system 3. A relationship between operating speed and/or power consumption and efficiency may be known (e.g. predicted, calibrated, provided, input via said input means 111) for said sub-process system 3. The processor 110 can determine the efficiency of said sub-process system 3 from said measured operating speed and/or power consumption and said relationship.

The display 112 can display the calculated efficiency of said one or more sub-process systems 3. The efficiencies may be displayed on a schematic map of the hydrocarbon production system 1 corresponding to the respective locations of the actual hydrocarbon production system to which said displayed information relates.

The controller 113 can determine whether or not replacement or repair would be beneficial in terms of overall production value and/or emissions.

The display 112 can display the calculated fluid data (i.e. the fluid data calculated using the above method). The fluid data may be displayed on a schematic map of the hydrocarbon production system 1 corresponding to the respective locations of the actual hydrocarbon production system 1 to which said displayed data relates.

As mentioned above, the hydrocarbon production system may comprise a plurality of wells 2. The processor 110 is configured to determine the flow rate of the produced fluid for each well 2 respectively from the measured parameters, and/or the specified parameters.

The display 110 is configured to display the respective flow rates for each well 2. These may be displayed on a schematic map of the hydrocarbon production system 1 corresponding to the respective locations of the actual hydrocarbon production system 1 to which said displayed information relates.

The controller 113 is configured to control the components 3, 8 of the hydrocarbon production system 1 based at least in part on the determined flow rates for each well 2. In the case where the controller 113 is a human operator, the displayed information allows the human operator to make educated, informed decisions when controlling the hydrocarbon production system, especially with a view of optimizing emissions and/or production value. In the case where the controller 113 is an automated control, said determined information can be used in an automated decision-making process by the controller 113.

The processor 110 is configured to determine the amount of water saturated in the production fluid from the measured parameters, and/or the specified parameters.

Water may be present in the production fluid produced from the wells 2. The composition of the production fluid at the well/reservoir may be found at a given time by taking a test sample. The composition may include $N_2$, $CO_2$, water and different hydrocarbon compounds. The amount of water saturated in the reservoir (and hence produced in the production fluid from the reservoir through the wells 2) depends on the temperature and the pressure of the reservoir (i.e. the dew point depends on the temperature and the pressure). The temperature of the reservoir is typically constant over time. However, the pressure changes (typically decreases) as the production proceeds. Thus, as the reservoir conditions change over time, the amount of water saturated in the production fluid at reservoir conditions changes over time, and hence the amount of water in the produced fluid changes over time.

Downstream of the reservoir in the hydrocarbon production system 1, conditions may change relative to the reservoir conditions (i.e. the pressure and temperature may change). This may lead to water that was saturated in the production fluid forming hydrates. This is undesirable. In order to counter the formation of hydrates, typically an anti-hydrate formation agent (e.g. glycol) is added to the fluid via glycol sources 8.

Thus, from a known starting reservoir composition (found by taking a sample), and by tracking how measured parameters of the production fluid (such as pressure and temperature) change over time (possibly at various locations throughout the reservoir and/or hydrocarbon production system), the amount of glycol to be added to the produced fluid at one or more locations 8 in the hydrocarbon production system 1 in order to avoid hydrate formation can be determined by the processor 110. This can be determined in real time.

This information (e.g. the necessary glycol amounts and/or the amount of water in the production fluid at reservoir conditions and/or at various locations throughout the hydrocarbon production system) can be displayed on the display 112. This displayed information can then be used by a controller 113 (e.g. a human operator) to control the hydrocarbon production system (e.g. control anti-hydrate formation agent amounts) to reduce hydrate formation, and/or with a view of optimizing emissions and/or production value.

Additionally/alternatively, where the controller 113 is an automated controller, the determined water amounts and/or the anti-hydrate formation agent amounts can be provided from the processor to the controller in order to control the hydrocarbon production system (e.g. to control the anti-hydrate formation agent amounts in the hydrocarbon production system).

Thus, the processor 110 and the controller 113 are configured to use the determined amount of water in the production fluid to determine how much glycol to add to the production fluid to prevent hydrate formation, and whether adding said glycol would improve production value and/or emissions.

The determined emissions determined by the processor 110 are the emissions associated with each sub-process system 3 in the hydrocarbon production system 1 where energy may be lost and/or where power may be consumed. These may be summed to find the total emissions of the hydrocarbon production system 1.

The display 112 is configured to display the respective emissions for each sub-process system 3. These are displayed on a schematic map of the hydrocarbon production system 1 corresponding to the respective locations of the actual hydrocarbon production system 1 to which said displayed information relates.

The controller 113 is configured to control the components 3 of the hydrocarbon production system 1 based at least in part on the emissions.

The determined production value of the hydrocarbon production system 1 comprises the production value at a plurality of different locations throughout the hydrocarbon production system 1. Additionally, the determined production value of the hydrocarbon production system 1 comprises the total production value of the system 1 as a whole.

The display 112 is configured to display the respective production values for each location. These are displayed on a schematic map of the hydrocarbon production system 1 corresponding to the respective locations of the actual hydrocarbon production system 1 to which said displayed information relates.

The controller 113 is configured to control the components of the hydrocarbon production system 1 based at least in part on the production value(s).

The processor 110 is configured to determine, and possibly evaluate, the changes to the emissions and/or the production value of the hydrocarbon production system 1 in light of any changes to the operation of the hydrocarbon production system 1, e.g. changes made by the controller.

As is clear from the above, the processor 110 is configured to output information. Said information comprises information relating to the real time state of the system 1. The information is the determined values determined by the processor. The information is output to the display 112. Additionally, said information may be an instruction to the controller 113 of the system to perform an operation to alter the operating state of the system 1 (e.g. to alter the operation and/or state the sub-process systems 3).

Optionally, the processor 110 may be configured to also determine a forecast of future values or future trends in relation to the information that is output about the real time state of the system 1. That forecast may also be displayed via the display 112.

Thus, the information provided to the controller 113 may simply be an indication of the production value and/or emissions of the hydrocarbon production system 1. This information may be provided to the controller 113 directly or via the display 112. However, the information may also be an instruction to the controller 113 to alter the operation of the hydrocarbon production system 1, e.g. by altering the operation of one or more of the sub-process systems 3, to optimize the production value and/or the emissions The information provided to the controller 113 and display 112 is low resolution data. The high resolution information from the processor 110 and/or the sensors 102, 103, 104, 105, 106, 107, 108 is also available if required.

The information/values/data from the processor 110 and/or the sensors 102, 103, 104, 105, 106, 107, 108 can be conveyed to the controller 113 and/or display 112 via a communication network, such as the internet. The input interface 111 can also be in communication with the processor 110 via a communication network. This allows the input interface 111, the controller 113 and/or display 112 to be distant from the hydrocarbon control system 1. This also allows numerous operators to control the hydrocarbon production system 1 and/or to view the information at different locations, possibly all over the world.

The invention claimed is:

1. A system for providing information on production value and/or emissions of a hydrocarbon production system, the system comprising:
a plurality of sensors configured to measure a respective plurality of measured parameters of the hydrocarbon production system;
an input interface for inputting a plurality of specified parameters into the system; and
a processor configured to determine the production value and/or the emissions of the hydrocarbon production system in real time based upon the measured parameters and the specified parameters,
wherein:
the production value is a value in a currency or a currency per time unit; and
the specified parameters comprise parameters that are required by the processor to determine the production value and/or the emissions of the hydrocarbon production system.

2. The system of claim 1, wherein the hydrocarbon production system comprises one or more individual sub-process systems, wherein the plurality of sensors include a plurality of sub-process system sensors configured to measure a respective plurality of sub-process system measured parameters, and wherein the processor is configured to determine respective performances of the sub-process systems using the sub-process system measured parameters.

3. The system of claim 1, wherein the hydrocarbon production system comprises a plurality of sub-process systems, and wherein the determined emissions comprise total emissions of the hydrocarbon production system and emissions of the respective sub-process systems.

4. The system of claim 1, wherein the hydrocarbon production system comprises a plurality of sub-process systems, wherein the determined production value of the hydrocarbon production system comprises the production value at the respective sub-process systems and total production value of the hydrocarbon production system.

5. The system of claim 3, wherein the processor is configured to determine, using the emissions and/or the production value of one or more of the sub-process systems whether repair and/or replacement and/or cleaning of the one or more sub-process systems would improve total production value and/or the total emissions of the hydrocarbon production system.

6. The system of claim 1, wherein the specified parameters include reservoir data, constants, hydrocarbon market price and/or efficiency numbers.

7. The system of claim 6, wherein the measured parameters include pressure and/or temperature of a production fluid produced by the hydrocarbon production system at various locations in the hydrocarbon production system.

8. The system of claim 7, wherein the processor is configured to determine actual fluid composition and properties of the production fluid at the various locations in the hydrocarbon production system using the pressure and/or temperature measured parameters.

9. The system of claim 1, wherein the measured parameters include:
fluid data of a production fluid, such as pressure, temperature, flow rate and/or composition;
fluid data of a working fluid, such as pressure, temperature, flow rate and/or composition;
differential pressure of the production fluid across one or more individual sub-process systems of the hydrocarbon production system;
differential pressure of the working fluid across one or more individual sub-process systems of the hydrocarbon production system
flow rates of the production fluid at a plurality of locations of the hydrocarbon production system;
flow rates of the working fluid at a plurality of locations in the hydrocarbon production system;
fluid bulk density of the production fluid at a plurality of locations of the hydrocarbon production system;
fluid bulk density of the working fluid at a plurality of locations of the hydrocarbon production system;
salinity or conductivity of the production fluid at a plurality of locations of the hydrocarbon production system;
salinity or conductivity of the working fluid at a plurality of locations of the hydrocarbon production system;
liquid hold-up;
valve position of one or more valves of the hydrocarbon production system;
machine data of one or more machines of the hydrocarbon production system;
power consumption of one or more powered sub-process systems of the hydrocarbon production system;
energy/power loss due to one or more sub-process systems of the hydrocarbon production system; and/or
emission data from one or more energy sources of the hydrocarbon production system.

10. The system of claim 1, wherein the plurality of sensors include more than 500, 1000, 2000, 3000, 4000 or 5000 sensors configured to measure more than 500, 1000, 2000, 3000, 4000 or 5000 respective measured parameters.

11. The system of claim 10, wherein the processor is configured to use more than 500, 600, 700 or 800 mathematical relationships to determine the production value and/or the emissions of the hydrocarbon production system in real time based upon the measured parameters and the specified parameters.

12. The system of claim 1, wherein the hydrocarbon production system comprises one or more sub-process systems that are configured to be cooled or heated by a working fluid, wherein the measured parameters include fluid data of the working fluid, and wherein the processor is configured to determine efficiency of the one or more sub-process systems that are configured to be cooled or heated by the working fluid from the measured fluid data.

13. The system of claim 12, wherein the hydrocarbon production system comprises one or more sub-process systems configured to act on the production fluid to change energy of the production fluid, wherein the measured parameters include fluid data of the production fluid, and wherein the processor is configured to determine efficiency of the one or more sub-process systems configured to act on the production fluid from the measured fluid data.

14. The system of claim 13, wherein the hydrocarbon production system comprises one or more sub-process systems configured to consume energy, wherein the measured parameters include energy supplied to the one or more sub-process systems, and wherein the processor is configured to determine efficiency of the one or more sub-process systems from the measured energy supplied to the one or more sub-process systems.

15. The system of claim 14, wherein the one or more sub-process systems are configured to be heated or cooled by a working fluid and consume energy, and wherein the processor is configured to determine the efficiency of the one or more sub-process systems by comparing energy change in the working fluid passing through the one or more sub-process systems to the consumed energy.

16. The system of claim 14, wherein the one or more sub-process systems are configured to both act upon the production fluid and consume energy, and wherein the processor is configured to determine the efficiency of the one or more sub-process systems by comparing energy change in the production fluid passing through the one or more sub-process systems to the consumed energy.

17. The system of claim 14, wherein the one or more sub-process systems are configured to be heated or cooled by the working fluid, act upon the production fluid and consume energy, and wherein the processor is configured to determine the efficiency of the one or more sub-process systems by comparing the energy change in the production fluid and the working fluid passing through the one or more sub-process systems to the consumed energy.

18. The system of claim 1, wherein the hydrocarbon production system comprises one or more sub-process systems configured to operate at variable speeds and/or consume variable amounts of power, wherein the measured parameters include operating speed and/or power consumption of the one or more sub-process systems, wherein a relationship between operating speed and/or power consumption and efficiency is known for the one or more sub-process systems, and wherein the processor is configured to determine efficiency of the one or more sub-process systems from the measured operating speed and/or the power consumption and the relationship.

19. The system of claim 1, wherein the hydrocarbon production system comprises one or more sub-process systems configured to both consume energy and change the energy of the production fluid passing therethrough, wherein the processor is configured to determine or validate at least some of fluid data of the production fluid passing through the one or more sub-process system using the consumed energy and/or the determined efficiency of the one or more sub-process systems.

20. The system of claim 1, wherein the hydrocarbon production system comprises a plurality of wells, and wherein the processor is configured to determine a flow rate for each of the plurality of wells from the measured parameters.

21. The system of claim 20, wherein the processor is configured to determine an amount of water in the production fluid from the measured parameters.

22. The system of claim 21, wherein the processor is configured to use the amount of water in the production fluid to determine how much anti-hydrate formation agent should be added to the production fluid at one or more locations in the hydrocarbon production system in order to avoid hydrate formation.

23. The system of claim 1, wherein the processor is configured to determine changes to the emissions and/or the production value of the hydrocarbon production system in light of any changes to operation of the hydrocarbon production system or to forecast future changes that may occur in response to proposed changes.

24. The system of claim 23, wherein the processor is configured to output information comprising an instruction to a controller to alter the operation of the hydrocarbon production system.

25. The system of claim 1, wherein the processor is configured to forecast future trends or future values of the production value, the emissions and/or of any other value determined by the processor in relation to the hydrocarbon production system.

26. The system of claim 1, wherein the emissions of the hydrocarbon production system comprise an amount of energy consumed or lost by one or more components of the hydrocarbon production system.

* * * * *